United States Patent
Qiu

(10) Patent No.: US 9,096,025 B2
(45) Date of Patent: Aug. 4, 2015

(54) SILICONE HYDROGEL LENSES WITH CONVERTIBLE COMFORT AGENTS

(71) Applicant: Novartis AG, Basel (CH)

(72) Inventor: Yongxing Qiu, Duluth, GA (US)

(73) Assignee: Novartis AG, Basel (CH)

( * ) Notice: Subject to any disclaimer, the term of this patent is extended or adjusted under 35 U.S.C. 154(b) by 344 days.

(21) Appl. No.: 13/713,681

(22) Filed: Dec. 13, 2012

(65) Prior Publication Data

US 2013/0127077 A1 May 23, 2013

Related U.S. Application Data

(62) Division of application No. 12/499,113, filed on Jul. 8, 2009, now Pat. No. 8,357,760.

(60) Provisional application No. 61/135,476, filed on Jul. 21, 2008.

(51) Int. Cl.
| | |
|---|---|
| B29D 11/00 | (2006.01) |
| C08F 30/08 | (2006.01) |
| C08F 130/08 | (2006.01) |
| C08F 230/08 | (2006.01) |
| C08F 283/12 | (2006.01) |
| C08F 290/00 | (2006.01) |
| C08F 290/06 | (2006.01) |
| C08F 290/14 | (2006.01) |
| C08F 299/08 | (2006.01) |
| G02B 1/04 | (2006.01) |
| C08J 3/28 | (2006.01) |

(52) U.S. Cl.
CPC .......... B29D 11/00038 (2013.01); B29D 11/00 (2013.01); C08F 30/08 (2013.01); C08F 130/08 (2013.01); C08F 230/08 (2013.01); C08F 283/12 (2013.01); C08F 283/124 (2013.01); C08F 290/00 (2013.01); C08F 290/06 (2013.01); C08F 290/068 (2013.01); C08F 290/14 (2013.01); C08F 290/148 (2013.01); C08F 299/08 (2013.01); C08J 3/28 (2013.01); G02B 1/04 (2013.01); G02B 1/043 (2013.01); C08F 2810/20 (2013.01)

(58) Field of Classification Search
USPC ...................................... 525/327.4; 264/1.36
See application file for complete search history.

(56) References Cited

U.S. PATENT DOCUMENTS

| | | | |
|---|---|---|---|
| 4,042,552 A | 8/1977 | Grucza | |
| 4,045,547 A | 8/1977 | Le Boeuf et al. | |
| 4,099,859 A | 7/1978 | Merrill | |
| 4,312,575 A | 1/1982 | Peyman et al. | |
| 4,444,711 A | 4/1984 | Schad | |
| 4,460,534 A | 7/1984 | Boehm et al. | |
| 4,632,844 A | 12/1986 | Yanagihara et al. | |
| 5,198,477 A | 3/1993 | von der Haegen et al. | |
| 5,219,965 A | 6/1993 | Valint, Jr. | |
| 5,527,925 A | 6/1996 | Chabrecek | |
| 5,609,246 A | 3/1997 | Borghorst | |
| 5,612,389 A | 3/1997 | Chabrecek | |
| 5,612,391 A | 3/1997 | Chabrecek | |
| 5,621,018 A | 4/1997 | Chabrecek | |
| 5,760,100 A | 6/1998 | Nicolson | |
| 5,843,346 A | 12/1998 | Morrill | |
| 5,849,811 A | 12/1998 | Nicolson | |
| 5,894,002 A | 4/1999 | Boneberger | |
| 6,039,913 A | 3/2000 | Hirt | |
| 6,218,508 B1 | 4/2001 | Kragh | |
| 6,367,929 B1 | 4/2002 | Maiden | |
| 6,451,871 B1 | 9/2002 | Winterton | |
| 6,627,124 B1 * | 9/2003 | Herbrechtsmeier et al. . | 264/1.36 |
| 6,719,929 B2 | 4/2004 | Winterton | |
| 6,762,264 B2 | 7/2004 | Künzler | |
| 6,793,973 B2 | 9/2004 | Winterton | |
| 6,811,805 B2 | 11/2004 | Gilliard | |
| 6,822,016 B2 | 11/2004 | McCabe | |
| 6,896,926 B2 | 5/2005 | Qiu | |
| 7,052,131 B2 | 5/2006 | McCabe | |
| 7,091,283 B2 | 8/2006 | Müller | |
| 7,249,848 B2 | 7/2007 | Laredo | |
| 7,279,507 B2 | 10/2007 | Hu et al. | |
| 7,550,519 B2 | 6/2009 | Phelan | |
| 7,649,058 B2 | 1/2010 | McCabe | |
| 7,666,921 B2 | 2/2010 | McCabe | |
| 7,691,916 B2 | 4/2010 | McCabe | |
| 7,789,507 B2 | 9/2010 | Zanini | |
| 7,858,000 B2 | 12/2010 | Winterton | |
| 8,003,710 B2 | 8/2011 | Medina | |
| 8,030,369 B2 | 10/2011 | Winterton | |
| 8,071,658 B2 | 12/2011 | Zhou | |
| 8,071,703 B2 | 12/2011 | Zhou | |
| 8,263,679 B2 | 9/2012 | Zhou | |
| 8,283,429 B2 | 10/2012 | Zhou | |
| 8,404,783 B2 | 3/2013 | Chang | |

(Continued)

FOREIGN PATENT DOCUMENTS

| | | |
|---|---|---|
| EP | 0233581 A2 | 8/1987 |
| EP | 1818692 A2 | 8/2007 |
| WO | 03/022321 A2 | 3/2003 |
| WO | 2007/146137 A2 | 12/2007 |

*Primary Examiner* — Ling Choi
*Assistant Examiner* — Chun-Cheng Wang
(74) *Attorney, Agent, or Firm* — Jian Zhou

(57) ABSTRACT

The invention provides a silicone hydrogel contact lens including a hydrolyzable polymer. The hydrolyzable polymer can be converted by hydrolysis into a hydrophilic polymer which is capable of imparting the silicone hydrogel contact lens a hydrophilic surface without post-curing surface treatment.

16 Claims, No Drawings

(56) References Cited

U.S. PATENT DOCUMENTS

| | | |
|---|---|---|
| 2001/0037001 A1 | 11/2001 | Muller |
| 2003/0125498 A1 | 7/2003 | McCabe |
| 2003/0162862 A1 | 8/2003 | McCabe |
| 2005/0154080 A1 | 7/2005 | McCabe |
| 2005/0237483 A1 | 10/2005 | Phelan |
| 2006/0007391 A1 | 1/2006 | McCabe |
| 2006/0072069 A1* | 4/2006 | Laredo et al. ............ 351/160 H |
| 2006/0079598 A1 | 4/2006 | Winterton |
| 2006/0251696 A1 | 11/2006 | Winterton |
| 2007/0043140 A1 | 2/2007 | Lorenz |
| 2007/0138692 A1 | 6/2007 | Ford |
| 2007/0229757 A1 | 10/2007 | McCabe |
| 2007/0242219 A1 | 10/2007 | Zanini |
| 2008/0015282 A1 | 1/2008 | McCabe |
| 2008/0015315 A1 | 1/2008 | Chang |
| 2008/0124376 A1 | 5/2008 | Pruitt |
| 2008/0143003 A1 | 6/2008 | Phelan |
| 2008/0143958 A1 | 6/2008 | Medina |
| 2008/0174035 A1 | 7/2008 | Winterton |
| 2008/0231798 A1 | 9/2008 | Zhou |
| 2008/0234457 A1 | 9/2008 | Zhou |
| 2012/0041097 A1 | 2/2012 | Zhou |
| 2012/0046382 A1 | 2/2012 | Zhou |

\* cited by examiner

SILICONE HYDROGEL LENSES WITH CONVERTIBLE COMFORT AGENTS

This application is a divisional application of application Ser. No. 12/499,113 filed Jul. 8, 2009, which claims the benefits under 35 USC 119(e) of the U.S. Provisional Patent Application No. 61/135,476 filed Jul. 21, 2008 herein incorporated by reference in its entirety.

TECHNICAL FIELD OF THE INVENTION

The present invention is related to silicone hydrogel contact lenses containing hydrophilic comfort agents. The present invention is also related to method for making silicone hydrogel contact lenses of the invention from a silicone hydrogel lens formulation containing convertible comfort agent.

BACKGROUND OF THE INVENTION

In recent years, soft silicone hydrogel contact lenses, for example, Focus NIGHT & DAY® and O2OPTIX™ (CIBA VISION), and PureVision®(Bausch & Lomb), Acuvue® Advance™ and Acuvue® Oasys™ become more and more popular because of their high oxygen permeability and comfort. "Soft" contact lenses conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

However, a silicone hydrogel material typically has a surface or at least some areas of its surface which is hydrophobic (non-wettable). Hydrophobic surface or surface areas will up take lipids or proteins from the ocular environment and may adhere to the eye. Thus, a silicone hydrogel contact lens will generally require a surface modification.

In order to modify the surface hydrophilicity of contact lenses, contact lenses can be subject to surface treatment prior to cast-molding, for example, by incorporating wetting agents into a lens formulation for making the contact lenses as proposed in U.S. Pat. Nos. 4,045,547, 4,042,552, 5,198,477, 5,219,965, 6,367,929 and 6,822,016, 7,279,507. This type of method may be cost effective because after cast-molding of contact lenses there is no additional posterior surface treatment process required for modifying the surface hydrophilicity of the lens. In addition, controllably-leachable wetting agents can be incorporated into lens formulations for making contact lenses which are capable of being released into the eye while wearing them to alleviate some wearer discomfort symptoms, as described in U.S. patent application Ser. Nos. 11/810,601 and 11/934,817 and U.S. Patent Application Publication Nos. 2006/0251696 A1 and 2006/0079598 A1. However, the wetting agents are hydrophilic in nature and have very poor miscibility with some polymerizable hydrophobic components in silicone hydrogel lens formulation. One or more suitable compatibilizing agents must be used to render the wetting agents adequately (but still not completely) miscible with silicone hydrogel lens formulations. Choice for such compatibilizing agents is limited. Without compatibilizing agent, poor miscibility of a wetting agent with a silicone hydrogel lens formulation can cause the turbidity of the lens formulation and adversely affect the optical properties of resultant silicone hydrogel contact lenses.

Therefore, there exists a need for a method of making silicone hydrogel contact lenses having comfort agents (or lubricants) and for a method of incorporating lubricants into silicone hydrogel contact lenses.

SUMMARY OF THE INVENTION

The present invention, in one aspect, provides a silicone hydrogel contact lens. The silicone hydrogel contact lens of the invention comprises: a silicone hydrogel material and a hydrophilic polymer, wherein the silicone hydrogel material is obtained by polymerizing a lens-forming material including (1) at least one silicone-containing monomer, at least one silicone-containing macromer, at least one silicone-containing prepolymer, or combination thereof and (2) a hydrolyzable polymer without crosslinkable groups which can participate in the polymerization, wherein the hydrophilic polymer is derived from the hydrolyzable polymer by converting the hydrolyzable polymer in the obtained silicone hydrogel material to the hydrophilic polymer through hydrolysis, wherein the hydrophilic polymer in the silicone hydrogel material is capable of imparting the silicone hydrogel contact lens a hydrophilic surface without post-curing surface treatment.

The present invention, in another aspect, provides a silicone hydrogel contact lens. The silicone hydrogel contact lens of the invention comprises: a silicone hydrogel material and a hydrophilic polymer which is covalently anchored to the polymer matrix of the silicone hydrogel material, wherein the silicone hydrogel material is obtained by polymerizing a lens-forming material including (1) at least one silicone-containing monomer, at least one silicone-containing macromer, at least one silicone-containing prepolymer, or combination thereof and (2) a hydrolyzable polymer with one sole crosslinkable group, wherein the hydrophilic polymer is derived from the hydrolyzable polymer by converting the hydrolyzable polymer in the obtained silicone hydrogel material to the hydrophilic polymer through hydrolysis, wherein the hydrophilic polymer in the silicone hydrogel material is capable of imparting the silicone hydrogel contact lens a hydrophilic surface without post-curing surface treatment.

The present invention, in a further aspect, provides a method for making silicone hydrogel contact lenses, the method comprising the steps of: (a) obtaining a mold having a first mold half and a second mold half, wherein the first mold half includes a first molding surface and the second mold half includes a second molding surface, wherein the first and second mold halves are configured to receive each other such that a lens-forming cavity is formed between the first molding surface and the second molding surface; (b) dispensing a silicone hydrogel lens-forming material into the lens-forming cavity of the mold, wherein the silicone-hydrogel lens-forming material comprises a non-crosslinkable hydrolyzable polymer and at least one member selected from the group consisting of a silicone-containing monomer, a silicone-containing macromer, a silicone-containing prepolymer, and a mixture thereof; (c) curing the lens-forming material within the lens-forming cavity to form a silicone hydrogel contact lens containing the non-crosslinkable hydrolyzable polymer; and (d) converting the non-crosslinkable hydrolyzable polymer in the silicone hydrogel contact lens into hydrophilic polymer, whereby the hydrophilic polymer in the silicone hydrogel contact lens is capable of imparting the silicone hydrogel contact lens a hydrophilic surface without post-curing surface treatment.

This and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized actinically. Low molecular weight typically means average molecular weights less than 700 Daltons. In accordance with the invention, a monomer can be a vinylic monomer or a compound comprising two thiol groups. A compound with two thiol groups can participate in thiol-ene step-growth radical polymerization with a monomer with vinyl group to form a polymer. Step-growth radical polymerization can be used in making contact lenses, as described in a commonly-owned copending U.S. patent application Ser. No. 12/001,562, herein incorporated in reference in its entirety.

A "silicone-containing monomer" refers to a monomer which contains silicone and can be crosslinked actinically to obtain a polymer.

A "vinylic monomer", as used herein, refers to a monomer that has an ethylenically unsaturated group and can be polymerized actinically or thermally.

The term "olefinically unsaturated group" or "ethylenically unsaturated group" is employed herein in a broad sense and is intended to encompass any groups containing a >C=C< group. Exemplary ethylenically unsaturated groups include without limitation acryloyl, methacryloyl, allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

The term "fluid" as used herein indicates that a material is capable of flowing like a liquid.

A "hydrophilic monomer" refers to a monomer which can be polymerized actinically to form a polymer that is water-soluble or can absorb at least 10 percent by weight of water.

A "hydrophobic monomer" refers to a monomer which is polymerized actinically to form a polymer that is insoluble in water and can absorb less than 10 percent by weight water.

A "macromer" refers to a medium and high molecular weight compound which can be polymerized and/or crosslinked actinically. Medium and high molecular weight typically means average molecular weights greater than 700 Daltons. In accordance with the invention, a macromer can be a macromer with one or more ethylenically unsaturated groups or with two or more thiol groups, which can participate in either free radical chain growth polymerization or thiol-ene step-growth radical polymerization. Preferably, a macromer contains ethylenically unsaturated groups and can be polymerized actinically or thermally. A "siloxane-containing macromer" is a macromer which contains silicone and can be crosslinked actinically.

A "prepolymer" refers to a starting polymer which contains multiple actinically crosslinkable groups and can be cured (e.g., crosslinked) actinically to obtain a crosslinked polymer having a molecular weight much higher than the starting polymer.

"Actinically crosslinkable groups" refers to ethylenically unsaturated groups or thiol groups.

A "silicone-containing prepolymer" refers to a prepolymer which contains silicone and can be crosslinked actinically to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "multiple" refers to at least two, preferably at least three.

The term "dangling" in reference to a hydrophilic polymer chain or a polysiloxane polymer chain in a polymer is intended to describe that the polymer chain which is anchored to the main chain of the polymer through one single covalent linkage (preferably at one of the ends of the polymer chain).

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocur® types, and Irgacur® types, preferably Darocur®1173, and Irgacur®2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. For example, a spatial limitation of UV radiation can be achieved by using a mask or screen that has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region. The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

"Surface modification", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, plasma processes in which an ionized gas is applied to the surface of an article (see, for example, U.S. Pat. Nos. 4,312,575 and 4,632,844 herein incorporated by reference in its entirety); a surface treatment by energy other than plasma (e.g., a static electrical charge, irradiation, or other energy source); chemical treatments; the grafting of hydrophilic monomers or macromers onto the surface of an article; mold-transfer coating process disclosed in U.S. Pat. No. 6,719,929 (herein incorporated by reference in its entirety); the incorporation of wetting agents into a lens formulation for making contact lenses (i.e., surface treatment prior to polymerization) proposed in U.S. Pat. Nos. 4,045,547, 4,042,552, 5,198,477, 5,219,965, 6,367,929 and 6,822,016, 7,279,507 (herein incorporated by references in their entireties); reinforced mold-transfer coating disclosed in PCT Patent Application Publication No. WO2007/146137 (herein incorporated by reference in its entirety); and layer-by-layer coating ("LbL coating") obtained according to methods described in U.S. Pat. Nos. 6,451,871, 6,719,929, 6,793,973, 6,811,805, 6,896,926 (herein incorporated by references in their entireties).

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (advancing angle measured by sessile drop method), which is obtained by averaging measurements of at least 3 individual contact lenses.

An "antimicrobial agent", as used herein, refers to a chemical that is capable of decreasing or eliminating or inhibiting the growth of microorganisms such as that term is known in the art.

"Antimicrobial metals" are metals whose ions have an antimicrobial effect and which are biocompatible. Preferred antimicrobial metals include Ag, Au, Pt, Pd, Ir, Sn, Cu, Sb, Bi and Zn, with Ag being most preferred.

"Antimicrobial metal-containing nanoparticles" refer to particles having a size of less than 1 micrometer and containing at least one antimicrobial metal present in one or more of its oxidation states.

"Antimicrobial metal nanoparticles" refer to particles which are made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3 oxygen)/(cm^2)(sec)(mm\ Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3 oxygen)(mm)/(cm^2)(sec)(mm\ Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm (oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where n'=rate of ion transport [mol/min]
A=area of lens exposed [mm$^2$]
D=Ionoflux Diffusion Coefficient [mm$^2$/min]
dc=concentration difference [mol/L]
dx=thickness of lens [mm]

The Ionoton Ion Permeability Coefficient, P, is then determined in accordance with the following equation:

$$\ln(1-2C(t)/C(0)) = -2APt/Vd$$

where:
C(t)=concentration of sodium ions at time t in the receiving cell
C(0)=initial concentration of sodium ions in donor cell
A=membrane area, i.e., lens area exposed to cells
V=volume of cell compartment (3.0 ml)
d=average lens thickness in the area exposed
P=permeability coefficient An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

The present invention, in one aspect, provides a silicone hydrogel contact lens. The silicone hydrogel contact lens of the invention comprises: a silicone hydrogel material and a hydrophilic polymer, wherein the silicone hydrogel material is obtained by polymerizing a lens-forming material including (1) at least one silicone-containing monomer, at least one silicone-containing macromer, at least one silicone-containing prepolymer, or combination thereof and (2) a hydrolyzable polymer without crosslinkable groups which can participate in the polymerization, wherein the hydrophilic polymer is derived from the hydrolyzable polymer by converting the hydrolyzable polymer in the obtained silicone hydrogel material to the hydrophilic polymer through hydrolysis, wherein the hydrophilic polymer in the silicone hydrogel material is capable of imparting the silicone hydrogel contact lens a hydrophilic surface without post-curing surface treatment.

Any suitable hydrolyzable polymers can be used in the invention. Examples of preferred hydrolyzable polymers include without limitation: hydroxylpropylmethylcellulose phthalate (HPMCP); cellulose acetate phthalate (CAP); poly (vinyl acetate phthalate) (PAVP); poly(vinylacetate) (PVAC); a copolymer of vinylpyrrolidone/vinylacetate; polyanhydride; a homopolymer of a vinylic monomer having a hydrolyzable trimethylsilyl group covalently linked to an oxygen or nitrogen atom of the vinylic monomer; a copolymer of a vinylic monomer having a hydrolyzable trimethylsilyl group covalently linked to an oxygen or nitrogen atom of the vinylic monomer with one or more vinylic monomers.

Hydroxylpropylmethylcellulose phthalate (HPMCP) can be converted to Hydroxylpropylmethylcellulose by hydrolysis. Cellulose acetate phthalate (CAP) can be converted to cellulose acetate or cellulose by hydrolysis. Poly(vinylacetate phthalate) (PAVP) can be converted to poly(vinylalcohol) in hydrolysis. Poly(vinylacetate) (PVAC) can be converted to poly(vinyl alcohol) in hydrolysis.

It is understood that to be hydrolyzable the trimethylsilyl (TMS) group is not linked to an oxygen atom which in turn is linked to a silicon atom. A vinylic monomer having a hydrolyzable trimethylsilyl group covalently linked to an oxygen or nitrogen atom of the vinylic monomer can be one vinylic monomer of formula (1)

in which $^1$R is H or —CH$_3$, -L- is —O— or

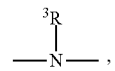

$^2$R is trimethylsilyl group (—Si(CH$_3$)$_3$) or a C$_4$-C$_{25}$ alkyl which is substituted by at least one trimethylsilyloxy, trimethylsilylamino group or trimethylsilyl-C$_1$-C$_7$ alkylamino group, $^3$R is H or C$_1$-C$_8$ alkyl group.

Examples of preferred monomers of formula (1) include without limitation N-trimethylsilylmethacrylamide, N-trimethylsilylacrylamide, trimethylsilylacrylate, trimethylsilylmethacrylate, 2,3-di-trimethylsilyloxyacrylate, 2,3-di-trimethylsilyloxymethacrylate, 5,6-di-trimethylsilyloxyhexylacrylate, and 5,6-di-trimethylsilyloxyhexylmethacrylate.

Examples of homopolymers of preferred monomers of formula (1) include without limitation poly(N-trimethylsilylmethacrylamide); poly(N-trimethylsilylacrylamide); poly(trimethylsilylacrylate), poly(trimethylsilylmethacrylate), poly(2,3-di-trimethylsilyloxyacrylate), poly(2,3-di-trimethylsilyloxymethacrylate), poly(5,6-di-trimethylsilyloxyhexylacrylate), and poly(5,6-di-trimethylsilyloxyhexylmethacrylate).

The molecular weight of the non-crosslinkable hydrolyzable polymer is preferably from about 5,000 to about 1,000,000 daltons, more preferably from about 10,000 to about 500,000 daltons, even more preferably from about 20,000 to about 100,000 daltons.

It is believed that a hydrolyzable polymer can be hydrophobic. Such hydrophobic polymers could be compatible with a silicone hydrogel lens formulation. There is no need to use a compatibilizing agent in a silicone hydrogel lens formulation to incorporate hydrophobic and hydrolyzable polymers.

A "lens-forming material" refers to a polymerizable composition which can be cured (i.e., polymerized and/or crosslinked) thermally or actinically in a mold to obtain a contact lens. Lens-forming materials are well known to a person skilled in the art. In accordance with the invention, a lens-forming material comprises at least one silicon-containing monomer or macromer or prepolymer, or can be any lens formulations for making soft contact lenses. Exemplary lens formulations include without limitation the formulations of lotrafilcon A, lotrafilcon B, etafilcon A, genifilcon A, lenefilcon A, polymacon, acquafilcon A, balafilcon, senofilcon A, and the like. Preferably, a silicone hydrogel lens-forming material used in the present invention comprises a silicone-containing macromer or prepolymer. A lens-forming material can further include other components, such as, one or more hydrophilic monomers, one or more hydrophobic monomers, one or more hydrophilic prepolymers, polymerization initiators (e.g., photoinitiator or thermal initiator), a visibility tinting agent (e.g., dyes, pigments, or mixtures thereof), UV-blocking (absorbing) agent, photosensitizers, inhibitors, antimicrobial agents (e.g., preferably silver nanoparticles), bioactive agent, leachable lubricants, fillers, and the like, as known to a person skilled in the art.

Where crosslinking of a polymerization is based on the mechanism of free radical chain-growth polymerization, a polymerizable component (e.g., monomer, macromer, or prepolymer) in the lens-forming material comprises preferably multiple ethylenically unsaturated groups.

Where crosslinking of a polymerization is based on the mechanism of thiol-ene step-growth radical polymerization, a polymerizable component (e.g., monomer, macromer, or prepolymer) in the lens-forming material preferably comprises multiple thiol groups or ene-containing groups. An "ene-containing group" is intended to describe a mono-valent or divalent radical that contains a carbon-carbon double which is not directly linked to a carbonyl group (—CO—), nitrogen atom, or oxygen atom, is preferably defined by any one of formula (I)-(III)

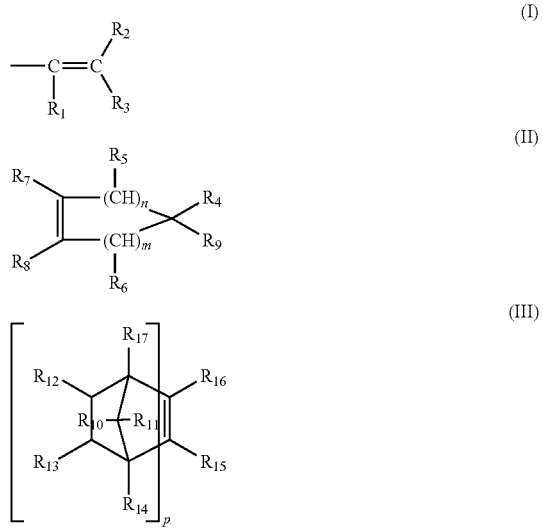

in which $R_1$ is hydrogen, or $C_1$-$C_{10}$ alkyl; $R_2$ and $R_3$ independent of each other are hydrogen, $C_1$-$C_{10}$ alkene divalent radical, $C_1$-$C_{10}$ alkyl, or —$(R_{18})_a$—$(X_1)_b$—$R_{19}$ in which $R_{18}$ is $C_1$-$C_{10}$ alkene divalent radical, $X_1$ is an ether linkage (—O—), a urethane linkage (—N), a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a and b independent of each other is zero or 1, provided that only one of $R_2$ and $R_3$ is a divalent radical; $R_4$-$R_9$, independent of each other, are hydrogen, $C_1$-$C_{10}$ alkene divalent radical, $C_1$-$C_{10}$ alkyl, or —$(R_{18})_a$—$(X_1)_b$—$R_{19}$, optionally $R_4$ and $R_9$ are linked through an alkene divalent radical to form a cyclic ring, provided that at least one of $R_4$-$R_9$ are divalent radicals; n and m independent of each other are integer number from 0 to 9, provided that the sum of n and m is an integer number from 2 to 9; $R_{10}$-$R_{17}$, independent of each other, are hydrogen, $C_1$-$C_{10}$ alkene divalent radical, $C_1$-$C_{10}$ alkyl, or —$(R_{18})_a$—$(X_1)_b$—$R_{19}$, p is an integer number from 1 to 3, provided that only one or two of $R_{10}$-$R_{17}$ are divalent radicals.

Any known suitable siloxane-containing monomers or macromers with one or more ethylenically unsaturated groups can be used in the actinically polymerizable composition for preparing the intermediary copolymer with pendant or terminal functional groups. Preferred examples of such monomers or macromers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); dimethacrylated or diacrylated polydimethylsiloxanes of various molecular weight; vinyl terminated polydimethylsiloxanes; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; polysiloxanylalkyl (meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing monomers or macromers; siloxane-containing macromers disclosed in U.S. Pat. No. 6,762,264 (here incorporated by reference in its entirety). Di and triblock macromers consisting of polydimethylsiloxane and polyakyleneoxides could also be of utility. For example one might use methacrylate end capped polyethyleneoxide-block-polydimethylsiloxane-block-polyethyleneoxide to enhance oxygen permeability. Suitable monofunctional hydroxyl-functionalized siloxane-containing monomers and suitable multifunctional hydroxyl-functionalized siloxane-containing monomers are commercially available from Gelest, Inc, Morrisville, Pa.

Examples of silicone-containing prepolymers include without limitation those disclosed in US Patent Application Publication Nos. 2001/0037001 A1, U.S. 2005/0237483 A1 and 2008/0015315 A1, U.S. Pat. No. 6,039,913, co-pending U.S. patent application Ser. Nos. 12/001,562, 12/001,521, 60/896,326, and 60/896,325, which are incorporated herein by references in their entireties. Preferably, the prepolymers used in the invention are previously purified in a manner known per se, for example by precipitation with organic solvents, such as acetone, filtration and washing, extraction in a suitable solvent, dialysis or ultrafiltration, ultra-filtration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

In accordance with the present invention, a silicone hydrogel lens-forming material can also comprise a hydrophilic vinylic monomer. Nearly any hydrophilic vinylic monomer can be used in the actinically polymerizable composition for preparing the intermediary copolymer with pendant or terminal functional groups. Suitable hydrophilic vinylic monomers are, without this being an exhaustive list, hydroxyl-substituted hydroxyl-substituted $C_1$-$C_8$ alkylacrylates and methacrylates, acrylamide, methacrylamide, $C_1$-$C_8$ alkylacrylamides, $C_1$-$C_8$ alkylmethacrylamides, ethoxylated acrylates, ethoxylated methacrylates, hydroxyl-substituted $C_1$-$C_8$ alkylacrylamides, hydroxyl-substituted $C_1$-$C_8$ alkylmethacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)—(where the term "amino" also includes quaternary ammonium), mono(lower alkylamino) (lower alkyl) and di(lower alkylamino)(lower alkyl)acrylates and methacrylates, allyl alcohol, N-vinyl alkylamide, N-vinyl-N-alkylamide, and the like.

Among the preferred hydrophilic vinylic monomers are N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, Aminopropyl methacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, and N-vinyl caprolactam.

A silicone hydrogel lens-forming material can also comprises a hydrophobic monomer. By incorporating a certain amount of hydrophobic vinylic monomer in a polymerizable fluid composition, the mechanical properties (e.g., modulus of elasticity) of the resultant polymer may be improved. Nearly any hydrophobic vinylic monomer can be used in the actinically polymerizable composition for preparing the intermediary copolymer with pendant or terminal functional groups. Suitable hydrophobic vinylic monomers include, without limitation, $C_1$-$C_{18}$-alkylacrylates and -methacrylates, $C_3$-$C_{18}$ alkylacrylamides and -methacrylamides, acrylonitrile, methacrylonitrile, vinyl-$C_1$-$C_{18}$-alkanoates, $C_2$-$C_{18}$-alkenes, $C_2$-$C_{18}$-halo-alkenes, styrene, $C_1$-$C_6$-alkylstyrene, vinylalkylethers in which the alkyl moiety has 1 to 6 carbon atoms, $C_2$-$C_{10}$-perfluoralkyl-acrylates and -methacrylates or correspondingly partially fluorinated acrylates and methacrylates, $C_3$-$C_{12}$-perfluoralkyl-ethyl-thiocarbonylaminoethyl-acrylates and -methacrylates, acryloxy and methacryloxy-alkylsiloxanes, N-vinylcarbazole, $C_1$-$C_{12}$-alkylesters of maleic acid, fumaric acid, itaconic acid, mesaconic acid and the like. Preference is given e.g. to $C_1$-$C_4$-alkylesters of vinylically unsaturated carboxylic acids with 3 to 5 carbon atoms or vinylesters of carboxylic acids with up to 5 carbon atoms.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, tris-trimethylsilyloxy-silyl-propyl methacrylate, 3-methacryloxypropyl-pentamethyl-disiloxane and bis(methacryloxypropyl)-tetramethyl-disiloxane.

A silicone hydrogel lens-forming material can further comprise an antimicrobial agent, preferably antimicrobial metal nanoparticles, more preferably silver nanoparticles.

In accordance with the present invention, a silicone hydrogel lens-forming material can further comprise various components, such as cross-linking agents, a chain transfer agent, initiator, UV-absorbers, inhibitors, fillers, visibility tinting agents (e.g., dyes, pigments, or mixtures thereof), and the like, as known to a person skilled in the art.

Cross-linking agents may be used to improve structural integrity and mechanical strength. Examples of cross-linking agents include without limitation allyl(meth)acrylate, lower alkylene glycol di(meth)acrylate, poly lower alkylene glycol di(meth)acrylate, lower alkylene di(meth)acrylate, divinyl ether, divinyl sulfone, di- or trivinylbenzene, trimethylolpropane tri(meth)acrylate, pentaerythritol tetra(meth)acrylate, bisphenol A di(meth)acrylate, methylenebis(meth)acrylamide, triallyl phthalate or diallyl phthalate. A preferred cross-linking agent is ethylene glycol dimethacrylate (EGDMA).

The amount of a cross-linking agent used is expressed in the weight content with respect to the total polymer and is preferably in the range from 0.05 to 5%, and more preferably in the range from 0.1 to 2%.

Initiators, for example, selected from materials well known for such use in the polymerization art, may be included in the lens-forming material in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronitrile (AIBN).

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

In accordance with the invention, a lens-forming material is a composition which can be a solution or a melt at a temperature from about 20° C. to about 85° C. Preferably, a lens-forming material is a solution of all desirable components in water, or an organic solvent, or a mixture of water and one or more organic solvents.

A solution of all desirable components can be prepared by dissolving them in any suitable solvent known to a person skilled in the art. Example of organic solvents includes without limitation tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidone, and mixtures thereof.

Hydrolysis of the hydrolysable polymer in the silicone hydrogel contact lens can be carried out according to any methods known to a person skilled in the art. Preferably, hydrolysis is carried out in-situ, i.e., directly in a sealed package contained the lens. Generally, contact lenses are packed in the primary package in an ophthalmically compatible storage solution and then is sterilized (e.g. in an autoclave at about 120° C. for a desired period of time) in the sealed primary package. Hydrolyzable polymer is preferably converted into hydrophilic polymer in the primary package during autoclave.

An "ophthalmically compatible solution" is characterized by at least having a pH in the range of from 6.0 to 8.0 and an osmolarity from 250 to 400 mOsmol/kg.

A "primary package" as used herein, refers to a package directly comprising the ophthalmic lens as to be used by the ophthalmic lens user. A typical primary package may be a blister package (as for example disclosed in EP-A-0680895 or EP-A-0233581, herein incorporated by references in their entireties) comprising a shell or base portion sealed with a laminated foil or cover. A primary package usually contains one contact lens in a small amount of an ophthalmically compatible solution (as for example a saline buffer solution with or without other comfort additives, e.g., surfactants, PVP, PVA, cellulose, polyethyleneglycol, etc.).

A contact lens of the invention has an oxygen permeability of preferably at least about 40 barrers, more preferably at least about 60 barrers, even more preferably at least about 80 barrers. In accordance with the invention, an oxygen permeability is an apparent (directly measured when testing a sample with a thickness of about 100 microns) oxygen permeability according to procedures described in Examples.

A contact lens of the invention has an elastic modulus of from about 0.2 MPa to about 2.0 MPa, preferably from about 0.3 MPa to about 1.5 MPa, more preferably from about 0.4 MPa to about 1.2, even more preferably from about 0.5 MPa to about 1.0 MPa.

A contact lens of the invention has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A contact lens of the invention further has a water content of preferably from about 15% to about 60%, more preferably from about 20% to about 55% by weight when fully hydrated. The water content of a silicone hydrogel contact lens can be measured according to Bulk Technique as disclosed in U.S. Pat. No. 5,849,811.

A contact lens of the invention has a surface hydrophilicity characterized by having an averaged water contact angle of about 90 degrees or less, preferably about 80 degrees or less, more preferably about 70 degrees or less, more preferably about 60 degrees or less.

The present invention, in another aspect, provides a silicone hydrogel contact lens. The silicone hydrogel contact lens of the invention comprises: a silicone hydrogel material and a hydrophilic polymer which is covalently anchored to the polymer matrix of the silicone hydrogel material, wherein the silicone hydrogel material is obtained by polymerizing a lens-forming material including (1) at least one silicone-containing monomer, at least one silicone-containing macromer, at least one silicone-containing prepolymer, or combination thereof and (2) a hydrolyzable polymer with one sole crosslinkable group, wherein the hydrophilic polymer is derived from the hydrolyzable polymer by converting the hydrolyzable polymer in the obtained silicone hydrogel material to the hydrophilic polymer through hydrolysis, wherein the hydrophilic polymer in the silicone hydrogel material is capable of imparting the silicone hydrogel contact lens a hydrophilic surface without post-curing surface treatment.

All of the various embodiments of lens-forming materials, hydrolysis of hydrolysable polymers, primary package, lens storage solution, and contact lens properties described above can be used in this aspect of the invention.

The molecular weight of the crosslinkable hydrolyzable polymer is preferably from about 500 to about 20,000 daltons, more preferably from about 1,000 to about 10,000 daltons, even more preferably from about 2,000 to about 8,000 daltons.

A crosslinkable hydrolyzable polymer can be prepared by covalently attaching acryloyl, methacryloyl or vinyl groups to a monofunctional group-terminated hydrolyzable polymer according to any known coupling reactions. For example, a hydrolyzable polymer can be prepared by covalently attaching one ethylenically unsaturated group to the functional group (e.g., amine, hydroxyl, carboxyl, isocyanate, epoxy groups) of a monofunctional group-terminated hydrolyzable polymer (i.e., with one sole functional group). Any vinylic monomer having a hydroxy, amino, carboxyl, epoxy, acidchloride, isocyanate group, which is coreactive with isocyanate, amine, hydroxyl, carboxy, or epoxy groups of a polymer in the absence or presence of a coupling agent (such as, e.g., EDC, diisocyanate, or diacid chloride), can be used in introducing ethylenically unsaturated group into the polymer. Examples of such vinylic monomers include, without limitation, for reacting with terminal hydroxy groups, 2-isocyanatoethyl methacrylate, methacrylic anhydride, 3-isopropenyl-alpha, alpha-dimethylbenzyl isocyanate, acryloyl chloride, or methacryloyl chloride, glycidyl methacrylate; for reacting with terminal amine groups, 2-isocyanatoethyl methacrylate, 3-isopropenyl-alpha, alpha-dimethylbenzyl isocyanate, methacrylic anhydride, acrylic acid, methacrylic acid, acryloyl chloride, or methacryloyl chloride; for reacting with terminal carboxy groups in the presence of EDC, vinylamine, 2-aminoethyl methacrylate or 3-aminopropyl methacrylamide. The above list is not exhaustive but illustrative. A person skilled in the art will know how to select a vinylic monomer with a functional group to functionalize ethylenically hydrolyzable polymers.

Monofunctional group-terminated hydrolyzable polymers can be prepared according to procedures similar to those described in U.S. Pat. No. 6,218,508, herein incorporated by reference in its entirety. For example, one or more vinylic monomer of formula (1) and a chain transfer agent (e.g., 2-mercaptoethanol, 2-aminoethanethiol, 2-mercaptopropinic acid, thioglycolic acid, thiolactic acid, or other hydroxymercaptanes, aminomercaptans, or carboxyl-containing mercaptanes) are copolymerized (thermally or actinically) in the presence or absence of an initiator to obtain a monohydroxy-, monocarboxyl-, or monoamine-terminated hydrolyzable polymer. Generally, the molar ratio of chain transfer agent to that of one or more vinylic monomers of formula (1) is from about 1:5 to about 1:100. The molar ratio of chain transfer agent to the vinylic monomer of formula (1) is selected to obtain a polymer with a molecular weight of from about 500 to about 20,000 daltons, more preferably from about 1,000 to about 10,000 daltons, even more preferably from about 2,000 to about 8,000 daltons.

Alternatively, monofunctional group-terminated hydrolysable polymers can be prepared by polymerizing the one or more monomers of formula (1) in the presence of a hydroxyl-, amine-, or carboxyl-containing free radical initiator at a molar ratio of initiator to the hydrophilic monomers of from about 1:30 to about 1:700. Examples of initiators with amine, hydroxyl, or carboxy group are azo initiators, such as, e.g., 2,2'-Azobis{2-[1-(2-hydroxyethyl)-2-imidazolin-2-yl]propane}dihydrochloride, 2,2'-Azobis[2-methyl-N-[1,1-bis(hydroxymethyl)-2-hydroxyethyl]propionamide, 2,2'-Azobis[2-methyl-N-(2-hydroxyethyl)propionamide], or 2,2'-Azobis{2-methyl-N-[2-(1-hydroxybutyl)]propionamide}, 2,2'-Azobis(2-methylpropionamide)dihydrochloride, 2,2'-Azobis[N-(2-carboxyethyl)-2-methylpropionamidine]tetrahydrate, or the likes.

The present invention, in a further aspect, provides a method for making silicone hydrogel contact lenses, the method comprising the steps of: (a) obtaining a mold having a first mold half and a second mold half, wherein the first mold half includes a first molding surface and the second mold half includes a second molding surface, wherein the first and second mold halves are configured to receive each other such that a lens-forming cavity is formed between the first molding surface and the second molding surface; (b) dispensing a silicone hydrogel lens-forming material into the lens-forming cavity of the mold, wherein the silicone-hydrogel lens-forming material comprises a non-crosslinkable hydrolyzable polymer and at least one member selected from the group consisting of a silicone-containing monomer, a silicone-containing macromer, a silicone-containing prepolymer, and a mixture thereof; (c) curing the lens-forming material within the lens-forming cavity to form a silicone hydrogel contact lens containing the non-crosslinkable hydrolyzable polymer; and (d) converting the non-crosslinkable hydrolyzable polymer in the silicone hydrogel contact lens into hydrophilic polymer, whereby the hydrophilic polymer in the silicone hydrogel contact lens is capable of imparting the silicone hydrogel contact lens a hydrophilic surface without post-curing surface treatment.

All of the various embodiments of lens-forming materials, hydrolysable polymers, and hydrolysis described above can be used in this aspect of the invention.

In accordance with the invention, the lens-forming material can be introduced (dispensed) into a cavity formed by a mold according to any known methods.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for preparing ocular lenses. For example, polymeric materials, such as polyethylene, polypropylene, polystyrene, PMMA, cyclic olefin copolymers (e.g., Topas® COC from Ticona GmbH of Frankfurt, Germany and Summit, N.J.; Zeonex® and Zeonor® from Zeon Chemicals LP, Louisville, Ky.), or the like can be used. Other materials that allow UV light transmission could be used, such as quartz, glass, $CaF_2$, and sapphire.

In a preferred embodiment, when the lens-forming material is composed essentially of prepolymers (i.e., substantially free of monomers and crosslinking agent having a molecular weight of less than 700 daltons), reusable molds can be used. Examples of reusable molds made of quartz or glass are those disclosed in U.S. Pat. No. 6,627,124, which is incorporated by reference in their entireties. In this aspect, the lens-forming material is poured into a mold consisting of two mold halves, the two mold halves not touching each other but having a thin gap of annular design arranged between them. The gap is connected to the mold cavity, so that excess lens-forming material can flow into the gap. Instead of polypropylene molds that can be used only once, it is possible for reusable quartz, glass, sapphire molds to be used, since, following the production of a lens, these molds can be cleaned rapidly and effectively to remove unreacted materials and other residues, using water or a suitable solvent, and can be dried with air. Reusable molds can also be made of a cyclic olefin copolymer, such as for example, Topas® COC grade 8007-S10 (clear amorphous copolymer of ethylene and norbornene) from Ticona GmbH of Frankfurt, Germany and Summit, N.J., Zeonex® and Zeonor0 from Zeon Chemicals LP, Louisville, Ky. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced and high fidelity to the lens design.

After the lens-forming material is dispensed into the mold, it is polymerized to produce a contact lens. Crosslinking may be initiated in the mold e.g. by means of actinic radiation, such as UV irradiation, ionizing radiation (e.g., gamma or X-ray irradiation). Where prepolymers of the invention are the polymerizable components in the lens-forming material, the mold containing the lens-forming material can be exposed to a spatial limitation of actinic radiation to crosslink the prepolymers.

The crosslinking according to the invention may be effected in a very short time, e.g. in 60 minutes, advantageously in 20 minutes, preferably in 10 minutes, most preferably in 5 minutes, particularly preferably in 1 to 60 seconds and most particularly in 1 to 30 seconds.

Opening of the mold so that the molded article can be removed from the mold may take place in a manner known per se.

If the molded contact lens is produced solvent-free from an already purified prepolymer according to the invention, then after removal of the molded lens, it is not normally necessary to follow up with purification steps such as extraction. This is because the prepolymers employed do not contain any undesired constituents of low molecular weight; consequently, the crosslinked product is also free or substantially free from such constituents and subsequent extraction can be dispensed with. Accordingly, the contact lens can be directly transformed in the usual way, by hydrolysis and hydration, into a ready-to-use contact lens. Appropriate embodiments of hydration are known to the person skilled in the art, whereby ready-to-use contact lenses with very varied water content may be obtained. The contact lens is expanded, for example, in water, in an aqueous salt solution, especially an aqueous salt solution having an osmolarity of about 200 to 450 milli-osmole in 1000 ml (unit: mOsm/ml), preferably about 250 to 350 mOsm/l and especially about 300 mOsm/l, or in a mixture of water or an aqueous salt solution with a physiologically compatible polar organic solvent, e.g. glycerol. Preference is given to expansions of the article in water or in aqueous salt solutions.

If the molded contact lens is produced from a solution of an already purified prepolymer according to the invention, then the crosslinked product also does not contain any troublesome impurities. It is therefore not necessary to carry out subsequent extraction. The contact lenses obtained by this process are subject to hydrolysis and hydration processes.

Similarly, if the molded contact lens is produced from a solvent solution of an already purified prepolymer according to the invention, it is not necessary to carry out subsequent extraction, but instead of hydration process to replace the solvent.

The molded contact lenses can further subject to further processes, such as, for example, surface treatment, sterilization, and the like.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Example 1

Surface Hydrophilicity (Wettability) Tests

Water contact angle on a contact lens is a general measure of the surface hydrophilicity (or wettability) of the contact lens. In particular, a low water contact angle corresponds to more hydrophilic surface. Average contact angles (advancing) of contact lenses are measured using sessile drop method.

Coating Intactness Tests

The intactness of a coating on the surface of a contact lens can be tested according to Sudan Black stain test as follow. Contact lenses with a coating (e.g., an LbL coating, a plasma coating, or any other coatings) are dipped into a Sudan Black dye solution (Sudan Black in vitamin E oil). Sudan Black dye is hydrophobic and has a great tendency to be adsorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated.

Coating Durability Tests

The lenses are digitally rubbed 30 times with Aquify® multi-purpose lens care solution and then rinsed with Softwear® saline. The digitally rubbed lenses are then soaked in Softwear® saline for 30 minutes. The above procedure is repeated for a given times, e.g., from 1 to 30 times, (i.e., number of consecutive digital rubbing tests which imitate cleaning and soaking cycles). The lenses are then subjected to Sudan Black test (i.e., coating intactness test described above) to examine whether the coating is still intact. To survive digital rubbing test, there is no significantly increased staining spots (e.g., staining spots covering no more than about 5% of the total lens surface).

Oxygen Permeability Measurements.

The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app}=Jt/(P_{oxygen})$$

where

J=oxygen flux [microliters O$_2$/cm$^2$-minute]

$P_{oxygen}=(P_{measured}-P_{water}\text{vapor})=(\% O_2 \text{ in air stream})$ [mm Hg]=partial pressure of oxygen in the air stream $P_{measured}$=barometric pressure (mm Hg)

$P_{water}$vapor=0 mm Hg at 34° C. (in a dry cell) (mm Hg)

$P_{water}$vapor=40 mm Hg at 34° C. (in a wet cell) (mm Hg)

t=average thickness of the lens over the exposed test area (mm)

where $Dk_{app}$ is expressed in units of barrers. The oxygen transmissibility (Dk/t) of the material may be calculated by dividing the oxygen permeability ($Dk_{app}$) by the average thickness (t) of the lens.

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients (D/D$_{ref}$) in reference to a lens material, Alsacon, as reference material. Alsacon has an ionoflux diffusion coefficient of 0.314×10$^{-3}$ mm$^2$/minute.

Example 2

Poly (butadiene/maleic anhydride) and other maleic anhydride copolymer

Poly (butadiene/maleic anhydride) (PBMA, MW 10K-15K, 25% in acetone) is purchased from Polysciences, Inc. A stock solution of photo-initiator Irgacur 2959 is prepared using 1-propanol as solvent. An appropriate amount of silicone-containing macromer, referred to as D32 which is prepared according to a procedure described in the Examples 4 to 10 of the U.S. Patent Application Publication No. 2008/0015315A (here in incorporated by reference in its entirety), is dissolved in 1-propanol to make up a solution with about 65% solid content (D32) and 35% solvent (1-propanol) and 0.25% of Irgacur. To this solution, either 5% or 10% of poly (butadiene/maleic anhydride) is added. The percentage of the poly (butadiene/maleic anhydride) in the final formulation is relative to the macromer solid content. The formulation is then dosed into polypropylene molds and cured under UV light. The cure time, as inferred from photorheology experiment data, is usually less than 2 min. Once the lenses are cured, the molds are manually opened and then the lenses are de-molded in ethanol and extracted in ethanol for about 5 min, followed by two water rinsing steps, each for about 2 min. Then the lenses are packaged in phosphate buffered saline solution (PBS) and autoclaved. In some experiments, some other additives may also be added to the PBS. The lenses are then characterized, for example, by exampling its clarity visually, and by examining its surface properties such as wettability by contact angle measurement or lubricity by surface friction measurement.

As shown in table 1, the silicone hydrogel lenses remains to be visually clear even after incorporating to 10% of PBMA. Hydrophilic or wettable surface is achieved for lenses with additives as demonstrated by significantly lower contact angle. For example, for lenses packaged and autoclaved in PBS, the contact angle for the control lens without additive is about 110, while the contact angles are about 83, or about 64 degrees, for test lens with 5% or 10% of additive PBMA, respectively. For control lenses, the wettability as measured by contact angle did not improve when the lenses are packaged in PBS with wetting agent. For example, the contact angle remains to be about 109 when packaged and autoclaved in PBS with 5% Copolymer 845. For the test lenses with additives, the wettability is further improved by packing the lenses in PBS with wetting agent, such as Copolymer 845, or PVP of different molecular weight, etc.

TABLE 1

| # | Formulation | Saline | Lens clarity | Contact Angle |
|---|---|---|---|---|
| 1 | 35% 1-propanol + 65% D32 | PBS | Clear, 0 | 111 ± 6 |
| 2 | 35% 1-propanol + 65% D32 | 5% Copolymer 845 in PBS | Clear, 0 | 109 ± 5 |

TABLE 1-continued

| # | Formulation | Saline | Lens clarity | Contact Angle |
|---|---|---|---|---|
| 3 | 5% PBMA (from 25% solids in acetone) + 35% 1-propanol + 65% D32 | PBS | Clear, 0 | 83 ± 2 |
| 4 | 5% PBMA (from 25% solids in acetone) + 35% 1-propanol + 65% D32 | Saline 61 | Clear, 0 | 80 ± 8 |
| 5 | 5% PBMA (from 25% solids in acetone) + 35% 1-propanol + 65% D32 | 1% PVP(K12) in PBS | Clear, 0 | 62 ± 6 |
| 6 | 5% PBMA (from 25% solids in acetone) + 35% 1-propanol + 65% D32 | 1% PVP(K25) in PBS, pH 2.5 | Clear, 0 | 69 ± 14 |
| 7 | 5% PBMA (from 25% solids in acetone) + 35% 1-propanol + 65% D32 | 1% PVP(K25) in PBS | Clear, 0 | 55 ± 8 |
| 8 | 5% PBMA (from 25% solids in acetone) + 35% 1-propanol + 65% D32 | 5% Copolymer 845 in PBS, pH 2.5 | Clear, 0 | 78 ± 13 |
| 9 | 5% PBMA (from 25% solids in acetone) + 35% 1-propanol + 65% D32 | 5% Copolymer 845 in PBS | Clear, 0 | 78 ± 13 |
| 10 | 10% PBMA (from 25% solids in acetone) + 35% 1-propanol + 65% D32 | PBS | Clear, 0 | 64 ± 5 |
| 11 | 10% PBMA (from 25% solids in acetone) + 35% 1-propanol + 65% D32 | 5% Copolymer 845 in PBS | Clear, 0 | 57 ± 1 |
| 12 | 10% PBMA (from 25% solids in acetone) + 35% 1-propanol + 65% D32 | 1% PVP(K25) in PBS | Clear, 0 | 59 ± 6 |
| 13 | 10% PBMA (from 25% solids in acetone) + 35% 1-propanol + 65% D32 | 1% PVP(K12) in PBS | Clear, 0 | 61 ± 5 |

The lubricity of the lens surface is measured by friction measurement. As shown in Table 2, dramatically lower static and dynamic coefficient of friction (COF) value are achieved on test lenses with 5% or 10% PBMA additive, as compared to the control lens without additive. Wetting agent may further reduce the COF for the test lens. The lenses are then vortexed vigorously in PBS: the lenses are placed in PBS and vortexed for 30 seconds and PBS is replaced with PBS and vortexed again. This is repeated 5 times and then the COF is measured. Although the COF increase somewhat after vortexing, they are still significantly lower than that of control lenses.

TABLE 2

| Lens | Saline | COF (no Vortex) | | COF (Vortex*) | |
|---|---|---|---|---|---|
| | | Dynamic COF | Static COF | Dynamic COF | Static COF |
| control, no additive | PBS | 0.5671 ± 0.0499 | 1.0020 ± 0.1151 | NA | NA |
| Test, 5% PBMA | PBS | 0.0303 ± 0.0053 | 0.1107 ± 0.0234 | 0.0529 ± 0.0055 | 0.1417 ± 0.0243 |
| Test, 5% PBMA | 5% Copolymer 845/PBS | 0.0155 ± 0.0001 | 0.0594 ± 0.0003 | 0.0276 ± 0.0013 | 0.2247 ± 0.0347 |
| Test, 5% PBMA | 1% PVP (K25)/ PBS | 0.0178 ± 0.0023 | 0.0564 ± 0.0169 | 0.0279 ± 0.0007 | 0.1018 ± 0.0058 |
| Test, 5% PBMA | 1% PVP/PBS MW 1,300K | 0.0800 ± 0.0104 | 0.1705 ± 0.0112 | 0.0841 ± 0.0016 | 0.1777 ± 0.0063 |
| Test, 10% PBMA | PBS | 0.0137 ± 0.00002 | 0.0948 ± 0.0190 | 0.0749 ± 0.0028 | 0.1816 ± 0.0282 |
| Test, 10% PBMA | 5% Copolymer 845/PBS | 0.0119 ± 0.0004 | 0.0476 ± 0.0010 | 0.0488 ± 0.0007 | 0.1264 ± 0.0022 |
| Test, 10% PBMA | 1% PVP (K25)/ PBS | 0.0133 ± 0.0015 | 0.1113 ± 0.0129 | 0.0243 ± 0.0001 | 0.1613 ± 0.0119 |
| Test, 10% PBMA | 1% PVP (K12)/ PBS | 0.0152 ± 0.0005 | 0.0997 ± 0.0008 | 0.0241 ± 0.0008 | 0.1313 ± 0.0263 |

*The lenses are then vortexed vigorously in PBS: the lenses are placed in PBS and vortexed for 30 seconds and PBS is replaced with PBS and vortexed again. This is repeated 5 times and then the COF is measured.

Other maleic anhydride polymers are also tested. For example, lenses with poly (ethylene/Maleic Anhydride) (1:1, MW 100K, Polysciences, Inc) are made and tested for contact angle and COF. In this example, the solvent used in formulation is ethanol, instead of 1-propanol. As shown in table 3, slightly lower contact angle is observed and significant lower COF is achieved.

TABLE 3

| # | Saline | Contact angle | COF before vortex | | COF after vortex | |
|---|---|---|---|---|---|---|
| | | | Dynamic COF | Static COF | Dynamic COF | Static COF |
| 1 | PBS | 107 ± 5 | 0.0310 ± 0.0014 | 0.4144 ± 0.0285 | 0.1005 ± 0.0044 | 0.4487 ± 0.1299 |
| 2 | 1% PVP (K25)/ PBS | 109 ± 2 | 0.0216 ± 0.0002 | 0.2803 ± 0.0190 | 0.1436 ± 0.0038 | 0.3749 ± 0.0761 |

Example 3

Poly(ethyl acrylate-acrylic acid)

Studies are performed with Poly(ethyl acrylate-acrylic acid) (1; 1, from Polysciences, Inc) additive according to a similar procedure described in Example 2. As shown in Table 4, clear lenses are not achieved and contact angle are only lowered slightly.

TABLE 4

| # | Lens additive | Saline | Lens clarity | Contact Angle |
|---|---|---|---|---|
| 1 | 5% poly ethyl acrylate-acrylic acid + 35% 1-propanol + 65% D32 | PBS | Hazy | 104 ± 6 |
| 2 | 5% poly ethyl acrylate-acrylic acid + 35% 1-propanol + 65% D32 | 5% Copolymer 845 in PBS, water extraction | Hazy | 100 ± 4 |
| 3 | 5% poly ethyl acrylate-acrylic acid + 35% 1-propanol + 65% D32 | 5% Copolymer 845 in PBS, ethanol extraction | Hazy | 100 ± 2 |
| 4 | 5% poly ethyl acrylate-acrylic acid + 35% 1-propanol + 65% D32 | 5% Copolymer 845 in PBS, pH 2.5 | Hazy | 114 ± 1 |
| 5 | 5% poly ethyl acrylate-acrylic acid + 35% 1-propanol + 65% D32 (AD46) | 1% PVP(K25) in PBS pH 2.5 | Hazy | 96 ± 6 |
| 6 | 10% poly ethyl acrylate-acrylic acid + 35% 1-propanol + 65% D32 | 5% Copolymer 845 in PBS, ethanol extraction | Little hazy, | 101 ± 5 |
| 7 | 10% poly ethyl acrylate-acrylic acid + 35% 1-propanol + 65% D32 | 5% Copolymer 845 in PBS, water extraction | Little hazy, | 100 ± 5 |
| 8 | 10% poly ethyl acrylate-acrylic acid + 35% 1-propanol + 65% D32 | PBS | Little hazy, | 101 ± 3 |
| 9 | 10% poly ethyl acrylate-acrylic acid + 35% 1-propanol + 65% D32 | 1% PVP(K25) in PBS pH 2.5 | Little hazy, | 94 ± 3 |
| 10 | 10% poly ethyl acrylate-acrylic acid + 35% 1-propanol + 65% D32 | 1% PVP(K25) in PBS | Little hazy, | 101 ± 4 |
| 11 | 10% poly ethyl acrylate-acrylic acid + 35% 1-propanol + 65% D32 | 5% Copolymer 845 in PBS, pH 2.5 | Little hazy, | 92 ± 4 |

Example 4

Poly(vinyl acetate) (PVAc) and poly(vinyl acetate) copolymers

PVAc of different Mw (e.g., 15k, 90k, 113K, 140k, 500k, etc, purchased from Aldrich or Alfa Aesar) are used in the study. In order to use PVAc as an additive to the formulation, the solubility of PVAc in different solvent are tested. This is done by simply adding appropriate amount of PVAc solid to a solvent to be tested. PVAc does not dissolve in 1-propanol, but can be dissolved when about 6% or more of water is added to 1-propanol as a co-solvent. PVAc can also be dissolved in methanol, acetone, methyl ethyl ketone (MEK), toluene, dimthyl sulfoxide (DMSO), dimthylacrylamide (DMA), dimethylforamide (DMF), etc. At room temperature, PVAc cannot be dissolved in ethanol and 2-propanol, but can be readily dissolved when heated the mixture up to 50 degrees C. or above, although the solution become cloudy once cooled down.

According to the procedure described in Example 2, lenses with 0.55 to 5% PVAc are made. In this case, PVAc is firstly dissolved in 1-propanol with 55 or 5% of water. The lenses are slightly haze to haze when the concentration of PVAc increases. The lenses are autoclaved in phosphate buffered saline Partially hydrolyzed PVAc or PVA-PVAc is also tested. For example, PVA-PVAc (viscosity of 3.6 cps and with degrees of hydrolysis of 41%, from Kuraray Co. Ltd) is tested in different solvents. Similar to PVAc, PVA-PVAc showed good solubility with acetone, methanol. 1-propanol, MEK, ethyl acetate, or any combination of solvents with 1-propanol does not dissolve PVA-PVAc at 5% concentration by total weight. One difference is that PVA-PVAc can be dissolved in ethanol, while ethanol is not a solvent for PVAc.

Poly(vinlylpyrrolidone)-poly(vinyl acetate) (PVP-PVAc) copolymers are tested. PVP-PVAc copolymers are available at different compositions and different Mw, for example, PVP-PVAc (70:30, Mw 65000), PVP-PVAc (50:50, Mw 45000) and PVP-PVAc (30:70, Mw 25000), already dissolved in 2-propanol, are purchased from PolySciences, Inc.

According to the procedure described in Example 2, formulations with 5% of these additives are made. The formulations are clear although the lenses are hazy.

Example 5

Hydroxypropyl methylcellulose phthalate (HPMCP) and cellulose hydrogen phthalate (CAP)

The solubility of HPMCP and CAP (from Aldrich) is tested by adding appropriate amount of the HPMCP or Cap in different solvents. Both HPMCP and CAP cannot be dissolved in methanol, or in 1-propanol. Both HPMCP and CAP can be dissolved at 10% (WN) concentration in following solvents: acetone, acetone/H2O (95:5), acetone/ethanol (1:1), dioxane, ethanol/H2O (8:2).

According to the procedure described in Example 2, lenses with 5% HPMCP are made using acetone or dioxane as solvent. The lenses are clear when using acetone as the solvent, but hazy when using dioxane as the solvent.

According to the procedure described in Example 2, lenses with 5% CAP are made using acetone or dioxane as solvent. The lenses are clear using either acetone or dioxane as the solvent.

Example 6

Synthesis of poly(2-(acryloxyethoxy)trimethylsiane)

To a 100 ml round bottom flask, 0.085 grams of Azobisisobutyronitrile (AIBN), 10.07 grams of 2-(acryloxyethoxy)trimethylsiane (from Gelest Inc.) and 54.72 grams of anhydrous 1-propanol are added. The solution is degassed with 4 times of freeze-thaw cycle and then filled with nitrogen. The solution is then warmed to about 60° C. and the polymerization reaction is allowed for about 4 hrs. Then the polymer sample in 1-propanol is analyzed by gel permeation chromatography (GPC) for molecular weight. The number-average molecular weight of the polymer is about 12600 and the polydispersity is about 3.

What is claimed is:

1. A method for making silicone hydrogel contact lenses, comprising the steps of:
   (a) obtaining a mold having a first mold half and a second mold half, wherein the first mold half includes a first molding surface and the second mold half includes a second molding surface, wherein the first and second mold halves are configured to receive each other such that a lens-forming cavity is formed between the first molding surface and the second molding surface;
   (b) dispensing a silicone hydrogel lens-forming material into the lens-forming cavity of the mold, wherein the silicone-hydrogel lens-forming material comprises a non-crosslinkable hydrolyzable polymer and at least one member selected from the group consisting of a silicone-containing monomer, a silicone-containing macromer, a silicone-containing prepolymer, and a mixture thereof, wherein the non-crosslinkable hydrolyzable polymer is selected from the group consisting of hydroxylpropylmethylcellulose phthalate, cellulose acetate phthalate, poly(butadiene/maleic anhydride), and combination thereof;
   (c) curing the lens-forming material within the lens-forming cavity to form a silicone hydrogel contact lens containing the non-crosslinkable hydrolyzable polymer; and
   (d) converting the non-crosslinkable hydrolyzable polymer in the silicone hydrogel contact lens into hydrophilic polymer, whereby the hydrophilic polymer in the silicone hydrogel contact lens is capable of imparting the silicone hydrogel contact lens a hydrophilic surface without post-curing surface treatment.

2. The method of claim 1, wherein the mold is reusable and the curing step is performed by means of a spatial limitation of actinic radiation.

3. The method of claim 1, wherein the non-crosslinkable hydrolyzable polymer is hydrolyzed into the hydrophilic polymer in a primary package containing the silicone hydrogel contact lens during autoclave.

4. The method of claim 1, wherein the non-crosslinkable hydrolyzable polymer has a number-average molecular weight of from about 5,000 to about 1,000,000 daltons.

5. The method of claim 4, wherein the non-crosslinkable hydrolyzable polymer is poly(butadiene/maleic anhydride).

6. The method of claim 4, wherein the non-crosslinkable hydrolyzable polymer is hydroxylpropylmethylcellulose phthalate.

7. The method of claim 4, wherein the non-crosslinkable hydrolyzable polymer is cellulose acetate phthalate.

8. The method of claim 2, wherein the non-crosslinkable hydrolyzable polymer is hydrolyzed into the hydrophilic polymer in a primary package containing the silicone hydrogel contact lens during autoclave.

9. The method of claim 2, wherein the non-crosslinkable hydrolyzable polymer has a number-average molecular weight of from about 5,000 to about 1,000,000 daltons.

10. The method of claim 9, wherein the non-crosslinkable hydrolyzable polymer is poly(butadiene/maleic anhydride).

11. The method of claim 9, wherein the non-crosslinkable hydrolyzable polymer is hydroxylpropylmethylcellulose phthalate.

12. The method of claim 9, wherein the non-crosslinkable hydrolyzable polymer is cellulose acetate phthalate.

13. The method of claim 9, wherein the non-crosslinkable hydrolyzable polymer has a number-average molecular weight of from about 5,000 to about 1,000,000 daltons.

14. The method of claim 13, wherein the non-crosslinkable hydrolyzable polymer is poly(butadiene/maleic anhydride).

15. The method of claim 13, wherein the non-crosslinkable hydrolyzable polymer is hydroxylpropylmethylcellulose phthalate.

16. The method of claim 13, wherein the non-crosslinkable hydrolyzable polymer is cellulose acetate phthalate.

* * * * *